United States Patent [19]

Beyer-Olsen et al.

[11] 3,966,386
[45] June 29, 1976

[54] MACHINES FOR ROTATIONAL MOULDING OF PLASTIC ARTICLES WITH ARTICLE REMOVAL MEANS

[76] Inventors: Knut Beyer-Olsen, Norvegjerde; Otto Steffenssen, Nova Store-Norve, both of 6000 Alesund, Norway

[22] Filed: Dec. 16, 1974

[21] Appl. No.: 533,088

[30] Foreign Application Priority Data
Dec. 14, 1973  Norway ............................. 4792/73

[52] U.S. Cl. .......................... 425/436 R; 425/435; 425/441; 425/455 R; 214/1 BB; 214/1 QA
[51] Int. Cl.² .................. B29C 5/04; B28B 7/10
[58] Field of Search .......... 425/436 RM, 441, 442, 425/435, 455, 429, 436 R; 214/1 BB, 1 QA, 304, DIG. 3

[56] References Cited
UNITED STATES PATENTS

| | | | |
|---|---|---|---|
| 3,060,497 | 10/1962 | Boyer | 425/441 |
| 3,079,637 | 3/1963 | Marzillier | 425/436 X |
| 3,244,303 | 4/1966 | Conner | 214/1 BB X |
| 3,630,391 | 12/1971 | Wilson | 214/1 BB |
| 3,750,806 | 8/1973 | Bartleet | 214/1 BB X |
| 3,754,667 | 8/1973 | Storch | 214/1 BB |
| 3,767,063 | 10/1973 | McKinven, Jr. | 214/1 BB |

*Primary Examiner*—Robert L. Spicer, Jr.
*Attorney, Agent, or Firm*—Wenderoth, Lind & Ponack

[57] ABSTRACT

A device for removal of a moulded product from a rotational moulding machine with one or a plurality of two-part moulds. The mould or moulds are movable between a closed and an open position on rotative supports in the machine frame. The removal means comprises a pair of complementary grasping elements operative to straddle each mould on either side of the mould opening zone and which can be moved towards each other at the moment when opening of the mould commences to grasp and hold the moulded product therein prior to further opening movement of the mould and to release the product therefrom. The grasping element support is operable to move from the position straddling the mould and to a position outside the machine for discharge of a moulded product, and vice versa.

9 Claims, 8 Drawing Figures

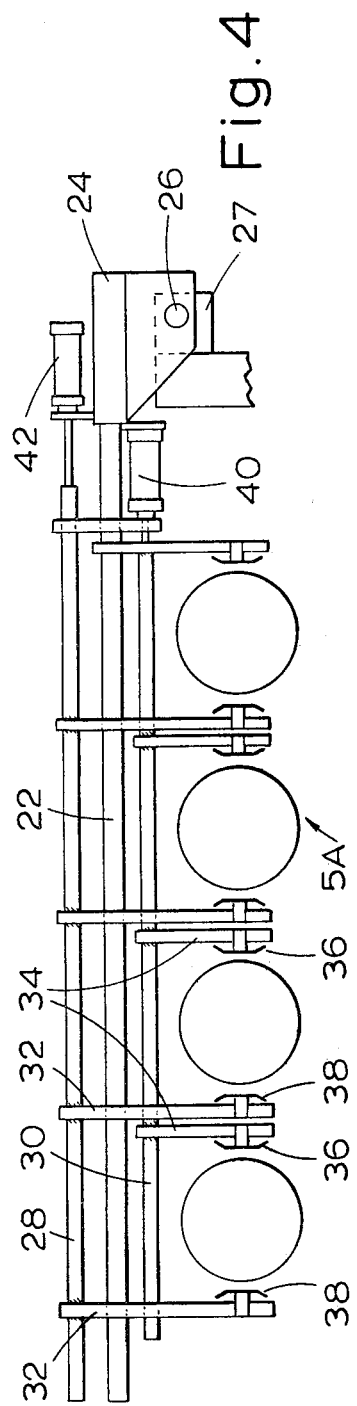
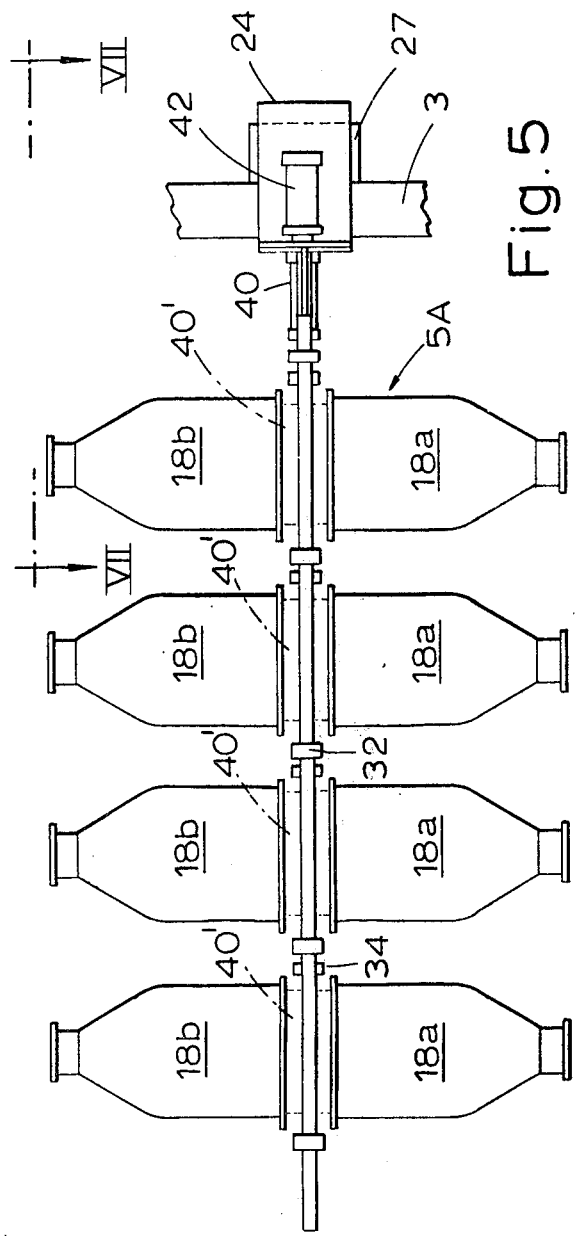

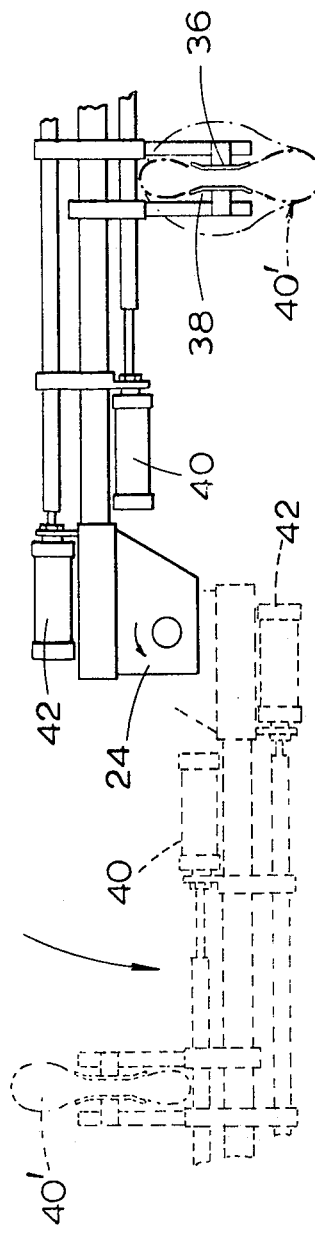
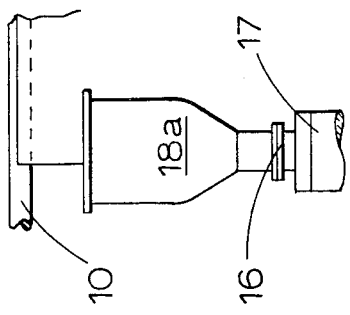
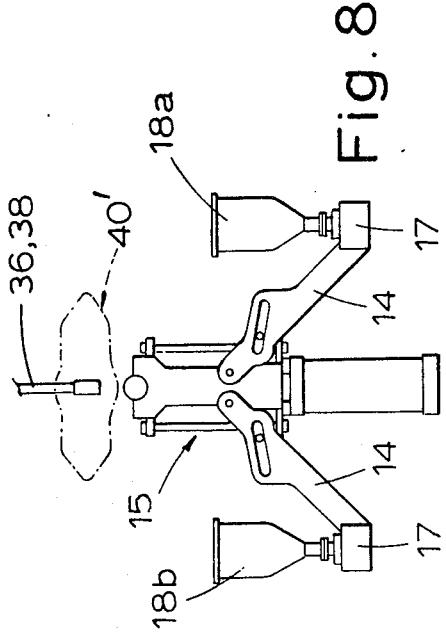
Fig. 7
Fig. 8

MACHINES FOR ROTATIONAL MOULDING OF PLASTIC ARTICLES WITH ARTICLE REMOVAL MEANS

BACKGROUND OF THE INVENTION

The present invention relates to an improvement in machines for rotational moulding of plastic products, more particular a device for removal of moulded articles from rotational moulding machines.

The invention shall in the present specification be described and illustrated in connection with the production of closed hollow bodies, for instance balls, fenders, buoys, etc. It shall, however, be understood that the invention can be adapted for use in connection with machines for moulding of other kinds of products, for instance containers, toys, etc. There are known several types of machines for rotational moulding of hollow bodies in plastics. These have that feature in common that the mould — or moulds, during the moulding process rotate simultaneously in two planes, preferably two planes extending normal to each other. A plastic charge in the mould will, during the movement of the mould, in consequence of its gravity, seek at any time the lowermost part of the mould surface whereby the charge is spread uniformly around the interior surface of the mould. By heating the mould the charge will thus finally form an even layer on the mould surface, and the mould can be opened in order to remove the product. Centrifugal forces may, but will normally not, influence the moulding process.

The plastic charge, for instance PVC or polyethylene, constitutes normally a vinyl plastisol composition, a polyethylene powder or possibly a so-called smelt. The mould must usually be heated during the moulding process. In order to heat the moulds there can be used heat ovens with the circulation of hot air. There are also known machines wherein the moulds are encompassed by a mantle for circulation of a hot fluid, for instance hot oil. The applicants have developed a rotational moulding machine wherein for the heating of the moulds are utilized special gas burners mounted on the frame supporting the moulds such that the burner participates in one of the rotational movements of the mould. In a preferred embodiment the mould or moulds are then subjected to a rotational movement in one plane and a tilting movement in the other, and the gas burners participate in the latter movement.

Compared with several other plastic moulding processes, for instance injection moulding, machinery and equipment for carrying out the rotational moulding of hollow bodies have hitherto been hampered by the shortcoming that the moulding process involves one or more steps including manual labour. The applicants have, developed rotational moulding machines which to a large degree operate more or less automatically or without the need for manual labour. Thus, the charging of the moulds prior to the moulding, the closing of the moulds, the double rotational casting process, the heating and possibly the cooling of the moulds, and finally the opening of the moulds are carried out automatically, and in accordance with an accurately stipulated time controlled operational cycle. In the final operational step in the production, more particularly release, removal of the readily moulded products from the moulds in the machines, have, however, hitherto included more or less manual work.

The principle object of the present invention has therefore been to provide mechanical equipment for releasing, firm holding and removal of moulded products from the rotational moulding machine.

It is well known that in the art of rotational moulding of hollow bodies in closed moulds it is difficult, if not to say impossible, accurately to predict how the product will look and conduct itself when the two halves of the mould are moved from each other such that the mould is opened. In the cases where the moulding parts have different shape and wherein for example casting cores or the like are located in the one mould part, one can to a certain degree predict that the moulded product then will be initially released from the mould part not having such cores, if such are not released or disconnected from the inside of the mould, but otherwise it is among other problems difficult to predict to what extent the moulded product will adhere to the mould surface. Even in those cases where the one mould part is so shaped that the moulded product normally will be attached to this part when the mould parts are moved from each other, it may incidentally occur that the product is adhered to the other mould part, such that one must utilize special means for releasing and removal of the product from the mould parts. Furthermore, one faces the situation where the product tears during such operation. In cases wherein the mould parts are identical, the moulded product will rather arbitrarily be positioned in the one or in the other mould part, and the product must then more or less manually be released from that mould part where it is positioned and thereafter be removed from the machine. In any case this operation demands that a machine operator during the moulding process be present when the moulds are opened, such that he, if necessary, is ready to release the product from the one or from the other of the mould parts and thereafter remove the product from the machine. If the moulding machine is of the kind including a plurality of side by side located moulds, this work obviously can be quite cumbersome and time consuming, since as mentioned it is frequently not possible to predict whether the product is located in the one or in the other mould part. Attempts have been carried out to develop mechanical means for doing this removal work, but hitherto no such means have worked satisfactorily. This is probably due to several factors. One factor is that products such as moulded hollow bodies of plastics present a comparatively soft and slippery surface only poorly adapted for being handled by mechanical means. The interior space in the hollow body has usually during the removal from the mould a pressure equal to or less than the surrounding atmospheric pressure, and the hollow body will consequently easily collapse and be inflated and will in any case present an evading or yielding surface, which surface furthermore may present a sloped surface as against a grasping means. A special problem is caused by the fact that it is difficult, if not to say impossible, to predict in which mould parts the product in fact is positioned subsequent to the mould parts having been moved away from each other. A further problem is that mechanical grasping means as such easily may damage the product particularly because these in many cases have not yet been thoroughly hardened and/or cooled down.

SUMMARY OF THE INVENTION

The principle object of the present invention is therefore with reference to the above circumstances to provide means for effective and durable automatic mechanical releasing and removal of moulded products from rotational moulding machines.

The device in accordance with the present invention includes a pivot beam having an opposed pair of holder elements adapted to be positioned in straddling position around the opening zone of the mould, which holders, when the opening of the mould is initiated and the product becomes visible, are moved into the opening slit between the mould parts and are put into contact with the opposite sides of the product in the mould thereby clamping the product between the holders, thereby causing partial collapsing and release of the product from the mould surfaces, whereafter the mould parts are moved further apart while the product is help firmly by the holders simultaneously as the moulded product is completely released from both mould parts, whereafter, when the mould parts are sufficiently moved apart, the pivot beam is swung away from the moulds and out of the machine whereupon the holder elements are anew moved away from each other whereby the product is dispensed from the machine.

An essential feature of the invention rests in that the holder elements are moved into contact with the moulded product as soon as the same appears in an opening zone between the mould parts when the same are moved slightly apart and in that the mould opening is not continued before the product is grasped by the holder elements.

The removal device in accordance with the invention may in principle be adapted for any kind of a moulding machine wherein there are utilized two-part moulds, but the invention is particularly developed for that kind of rotational moulding machine wherein each part of a two-part mould is permanently mounted upon a rotatable support spindle mounted in the machine frame, and wherein one, but preferably both support spindles are mounted for movement to and from the closed position of this mould. Full benefit of the invention is obtained in a rotational moulding machine of the kind comprising a plurality of side by side arranged moulds and wherein the mould parts are mounted for movement to and from the closed position along a common axis, and the removal means in accordance with the invention then comprises a suitably pivotable beam with two shuttle members provided with a plurality of holder elements in pairs, the number of which corresponds to the number of moulds in the machine, such that the products, as soon as the moulding process has been fulfilled, may be automatically grasped, held and thereafter removed and dispensed from the machine.

BRIEF DESCRIPTION OF THE DRAWINGS

A preferred embodiment of the invention shall in the following be described in detail with reference to the accompanying drawings, wherein:

FIGS. 4 and 5 are a lateral and plan view, respectively, of the device in accordance with the invention, the device shown in an enlarged scale and in operable position straddling the moulds in the machine.

FIG. 7 is a lateral view showing part of the device in the two end positions. The product "grasping" position is shown at the right and the discharge position (shown in dashed lines) at the left. These positions are 180° apart. The views are shown along the plane VII—VII in FIG. 5.

FIG. 8 is a lateral view similar to FIG. 2, illustrating the position of the moulded product (shown in dashed lines) when removed from the mould but not yet removed from the machine.

DETAILED DESCRIPTION OF THE INVENTION

Figure 1:
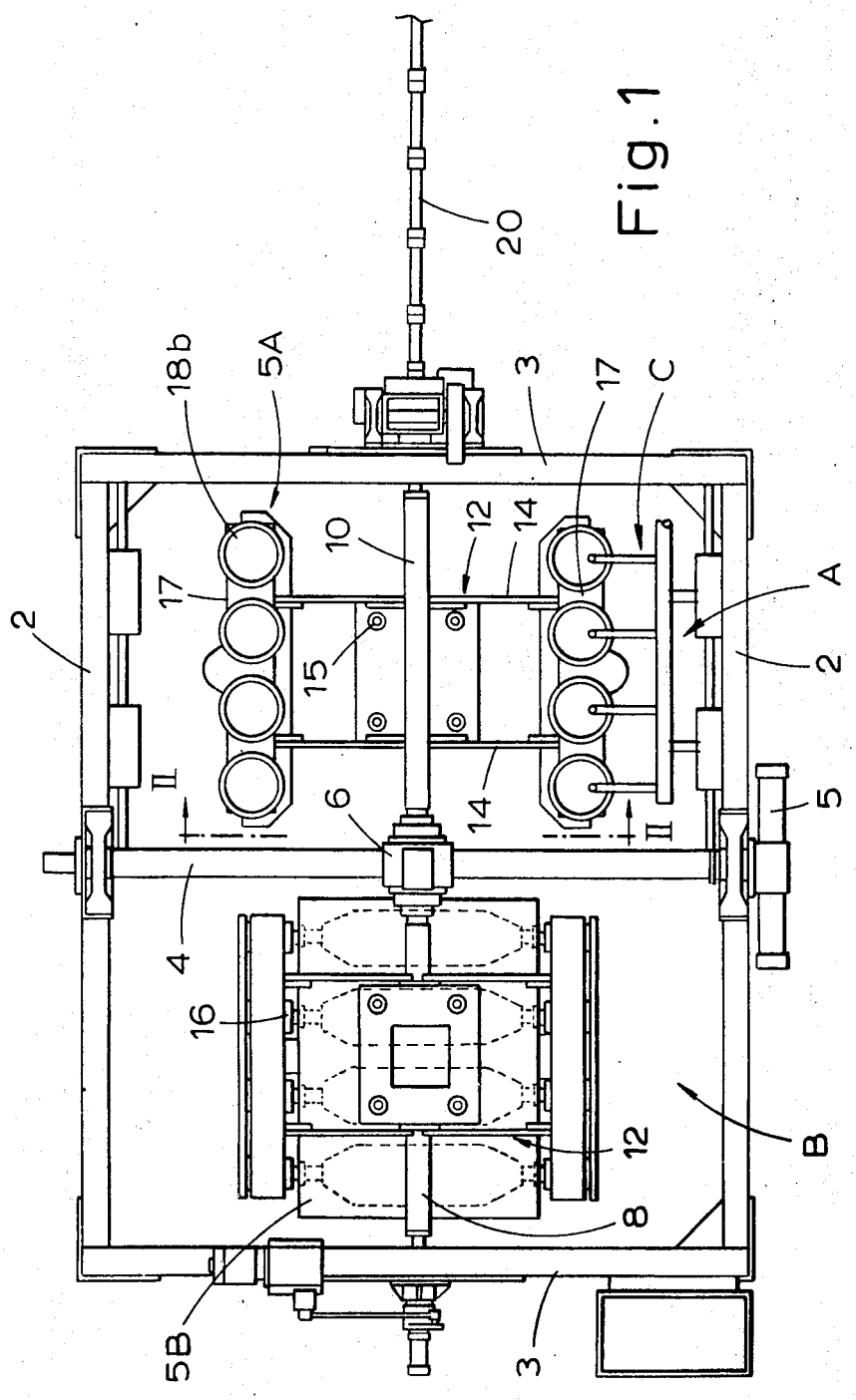
FIG. 1 is a plan view of a rotational moulding machine having two sets each comprising four moulds, which machine is equipped with the removal device in accordance with the invention.
Figure 2:
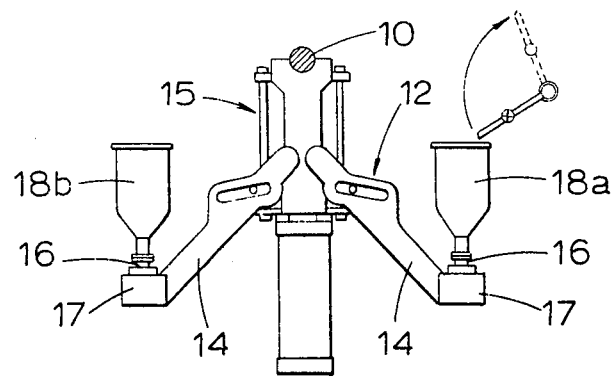
FIG. 2 is an elevational view along plane II—II in FIG. 1 showing one of the mould sets including the means for supporting and operating the moulds, the moulds being shown in the open position.

In the following specification the invention shall be described and shown in connection with a moulding machine developed by the applicant and which may operate without requiring manual labour. FIGS. 1 and 2 show a moulding machine comprising in essence the following main parts: A machine frame has upper frame elements 2 and 3 wherein there is journalled a support shaft 4 powered by cylinders 5 and in the centre of which is mounted a bracket 6 on the opposite sides of which are provided motored journals for two cantilevered pivot shafts 8 and 10 each supporting a cradle means 12 having coupled pivot arms 14 journalled in a support member 15. The arms 14 support housings 17 supporting mould spindles 16 for mould parts 18a, 18b, etc. This moulding machine thus comprises two sets, each comprising four moulds, herein generally designated 5A and 5B (FIG. 1). The machine further includes two operating stations designated A and B. When the one mould set, for instance 5A, thus is positioned in station A (by pivoting shaft 4), the other form set 5B is positioned in station B. At station A is carried out the charging of the moulds, and the closing and the opening procedure of the moulds. At station B is carried out the heating phase and possibly the cooling phase of the set of moulds which at any time is located in station B, and the set of moulds in station B is subjected to a double rotation procedure by rotating the cantilever shaft 8 (or 10) (rotation or tilting), and further each of the moulds is subjected to individual rotation about the support spindles 16 such that to each mould is imparted the desirable type of double rotation such that all parts of the mould surface are ultimately covered by the plastic charge positioned in the mould before closing the same. The shown machine thus constitutes a "twin machine" having two identical mould sets. The machine further includes, as will be understood, a number of other operational parts and means, such as a means for charging the moulds in station A (indicated by the letter C) motorized operation of all moving parts of the machine, heating, cooling of the moulds. But since these elements as such do not constitute the inventive concept of the present invention, it is assumed unnecessary to go into further description of the machine details thereof.

The essential point is that such a machine can carry out substantially or all necessary working steps for moulding hollow bodies in plastics However, prior to the present invention it was particularly necessary to employ manual labour in connection with the release and removal of the moulded products from the moulds.

The present invention comprises an automatic device for releasing and removing the moulded products from the moulds and out of the machine.

FIG. 1 shows at station A the one set of moulds 5A shown in open position, the mould part being swung down to either side such that the mould openings are pointing more or less upwards. The moulded hollow bodies are removed from the machine and are not shown. The removal is carried out by the device generally designated with the reference number 20, which device is mounted on the frame member 3. The device is pivotable 180° from an inside grasping position to an outside discharge position.

The device is shown more detailed in FIGS. 4 and 5 which show the device in the operational position straddling for example the mould set 5A in the machine as shown in a diagrammatic end view in FIG. 2 and comprising mould parts 18a and 18b. The device comprises a pivotal support beam 22 supported by a bracket housing 24 which is pivotable about a transverse pivot shaft 26 journalled in a bracket 27 mounted onto the machine frame element 3. On the beam 22 is displaceably journalled two shuttles 28 and 30 provided with laterally pointing arms 32, 32, 34, 34, etc. The arms 32, 32 on the upper (in shown position) shuttle 28 are journalled onto the beam 22, thereby supporting this shuttle while shuttle 28, 30 is journalled in openings in the arms 32, 32, etc. Both sets of arms 32, 32, 34, 34, respectively, extend in the same vertical plane and are at the lowermost or outer ends thereof provided with grasping and holder means 36 and 38, which are arranged in pairs oppositely directed on the respective shuttles 28 and 30 such that the grasping means of each pair face each other as shown. The shuttles 28 and 30 are each connected to the piston rod on a working cylinder 40 and 42 (pneumatic or hydraulic) respectively mounted on the bracket housing 24. The arms on the shuttles have as shown such length and the parts are otherwise such adapted to each other that when the beam 22 is pivoted over the machine the pairs of grasping means 36 and 38 come into position diametrically opposing or straddling each of the moulds in the respective mould set 5A or 5B, depending upon which set is positioned ready to be opened at station A in the machine. The shape, size etc. of the particular grasping means 36, 38 mounted on the arms depend obviously upon the shape and the size of the mould and thereby the product moulded therein. The grasping means may consist of soft or flexible cushions made from or applied with a material presenting good frictional contact with the moulded products. If the moulded products are flexible and/or inflatable products, the grasping means should present good frictional contact. If the products on the other hand for instance are rigid, stiff products it may be necessary to give the grasping means an arched shape such that they to a certain degree grasp around the opposite side of the moulded products.

The device is otherwise provided with other elements and equipment which are not shown in detail and which should not be necessary to describe in detail, such as motors and controls in order to carry out the various movements. The operation of the device can for instance be based upon hydraulic, pneumatic or electrical power sources or a combination of such sources. The shown machine is partly based upon hydraulic, partly upon pneumatic operation.

The moulding machine and the removal device in accordance with the invention will normally operate in the following fashion.

Figure 3:
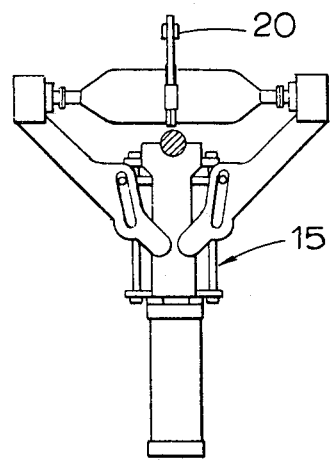
FIG. 3 is a view similar to FIG. 2, but with the moulds shown in the closed position.

One visualizes that the removal device 20 is positioned in the outside discharge position shown in FIG. 1 and that it is pivoted over the machine and is positioned in the position as shown in FIGS. 3 and 4 wherein the mould set A in this position is in closed position ready to be opened subsequent to having fulfilled the moulding process at station B. In this situation the moulds are slightly moved away from each other by a pivoting movement of the arms 14. This situation is illustrated in plane view in FIG. 5 and in a schematic elevational view in FIG. 6. The arms 32, and 34, with the grasping members 36 and 38 straddle each of the moulds just outside the opening zone of the moulds. The just moulded product, in the shown example inflatable fenders of vinyl plastics, will in this position become visible as indicated by 40'. The moulded products, that is the fenders, may in this position: 1) still be adhered to both mould parts such that the product is stretched at the mould opening zone, 2) be released from the mould surface in the one mould part but not from the other, or 3) be released from both of the mould parts. Notwithstanding what has happened during this initial opening movement, the products will still be positioned directly between the pairs of grasping means straddling the products. In this position and prior to the moulds being further opened, the working cylinders 40, 42 for the shuttles are actuated such that the grasping means couplewise are moved toward each other such that the products, that is the fenders, are grasped simultaneously as they are wholly or partly collapsed. This position is illustrated at the right side of FIG. 7, showing one pair of grasping means 36 and 38 having grasped and collapsed a fender 40 shown in dashed lines (it is assumed superfluous to show all grasping means, moulds etc. in FIG. 7, since all moulds etc. are identical). When the moulded part is firmly grasped, the opening of the mould is continued until the mould parts attain the position illustrated in FIGS. 7 and 8, wherein the fenders 40' will be kept as shown. The removal device is now pivoted out of the machine 180° to the position shown at the left in FIG. 7 with dashed lines (and as shown in FIG. ), whereafter the working cylinders 40 and 42 are reversed, with the consequence that the fenders are released whereupon they fall out to one side or the other, preferably down to a transport belt or the like (not shown).

Figure 6:
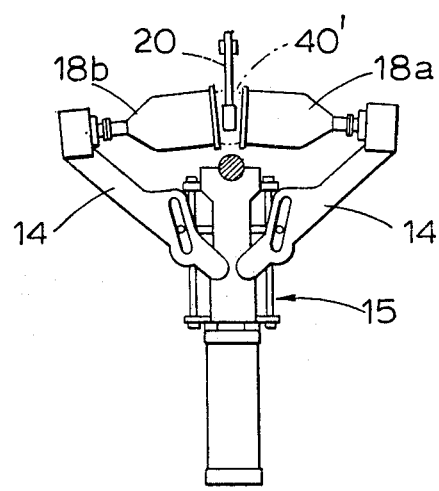
FIG. 6 is a view similar to FIG. 3, but as shown the moulds are in this position shown slightly opened and the removal device is shown in operating position straddling the mould(s).

During normal operation of the machine and the removal device in accordance with the invention it will usually be suitable to carry out the opening of the moulds in two steps, namely a first step wherein the moulds as mentioned only are slightly opened such that the grasping means 36 and 38 can be moved in between the opening edges of the moulds such as illustrated in FIG. 6, and then a second opening step initiated when the grasping means have grasped and possibly released the products from the moulds. Such a two-step opening procedure ensures that the products in the moulds are practically immovable being contacted and grasped by the grasping means. In many cases it will, however, be possible to carry out the entire mould opening movements as a continuous movement, possibly such that the opening movement, until the grasping means in well synchronized fashion have grasped the products, is carried out in a slow motion, whereafter the opening speed may be accelerated.

It will obviously be understood that the removal device in accordance with the invention can be realized in various embodiments depending upon the construction of the moulding machine, the shape and size of the moulds, and also the characteristics of the products being moulded. If the job concerns moulding of flexible, inflatable plastic products, the shuttles will normally move a distance such that the grasping means actually by clamping squeeze the products together such as illustrated in FIG. 7. Collapsing of the products will, however, only take place if the moulds are vented during the moulding such that atmospheric pressure prevails inside the product. However, in any case the clamping operation will require a certain time interval and the shuttle arms should continue to apply a pressure force until the grasping means firmly hold the product. Thereafter the moulds can be further opened. It should be understood that it is very inconvenient if a product incidentally slips out of a mould and/or off the grasping means since this may result that the entire machine must be brought to a halt until the product has been removed manually. If the production concerns moulding of more or less stiff or rigid products, for instance stiff floats for fishing gear, the grasping means should suitably be given a shape corresponding to the adjacent curvature of the product, such that the grasping means to a certain extent encompass the product at the grasping zone. In one type of rotational moulding machines only one of the mould parts is moved axially in order to open and close the mould while the other part is kept axially stationary. The device as shown could usually without modification be utilized also for such a machine.

We claim:

1. In a rotational moulding machine of the type including at least one two-part mould, each of the mould parts being mounted on separate rotatable shafts, means for simultaneously moving the mould parts of each mould from a closed moulding position wherein said mould parts are in contact, away from each other to an open moulded product release position wherein said mould parts are spaced from each other, and the split plane between said mould parts when in said closed moulding position being normal to the axis of said separate rotatable shafts; the improvement comprising means for automatically removing a moulded product from said mould, said removing means comprising:

at least one pair of complementary product grasping means positionable to straddle said mould adjacent said split plane when said mould parts are in said closed moulding position;

means for moving said product grasping means toward each other, into contact with a moulded product in said mould, as soon as said mould part moving means moves said mould parts from said closed moulding position by a sufficient distance to allow entry of said product grasping means, for thereby grasping and holding said moulded product prior to further separating movement of said mould parts, and for thus releasing said moulded product from said mould parts upon further separating movement of said mould parts; and support means, supporting said product grasping means, for moving said product grasping means from the position straddling said mould to a discharge position outside said moulding machine for discharge of said moulded product, and vice versa.

2. The improvement claimed in claim 1, wherein said support means comprises a support beam which is movable between the grasping position in said moulding machine and said discharge position outside said moulding machine, said product grasping means being reciprocally moulded along said support beam.

3. The improvement claimed in claim 2, wherein said support beam is pivotably supported on a frame of said moulding machine at a position laterally of said split plane of the mould.

4. The improvement claimed in claim 2, wherein said support means further comprises a shuttle member for each product grasping means reciprocably supported along said support beam, and arms forming lateral extensions of each shuttle, said product grasping means being mounted on said arms.

5. The improvement claimed in claim 1, wherein said rotational moulding machine comprises a plurality of individual moulds, and said removing means comprises a corresponding number of complementary pairs of product grasping means which are movably intercoupled for a simultaneous removal operation.

6. The improvement claimed in claim 1 wherein said mould part moving means comprises to move said mould parts from said closed moulding position to said open moulded product release position in two separate movements, namely, a first movement providing an opening slit sufficient for entry of said product grasping means therein on opposite sides of said product, and a second movement initiated when said product grasping means have completed their grasping movements and firmly hold said moulded product.

7. The improvement claimed in claim 1, wherein said mould part moving means comprises means to move said mould parts from said closed moulding position to said open moulded product release position in a continuous movement synchronized with the movement of said product grasping means such that said product grasping means enter between said mould parts as soon as the opening therebetween is sufficiently large for entry of said product grasping means.

8. The improvement claimed in claim 7, wherein said mould part moving means is operable to move said mould parts relatively slowly until said product grasping means have firm contact with said product, whereafter the mould opening movement is accelerated.

9. The improvement claimed in claim 1, wherein said product grasping means comprise flexible cushion-like elements.

* * * * *